United States Patent [19]

Yasui et al.

[11] 4,311,505
[45] Jan. 19, 1982

[54] METHOD OF MANUFACTURING GLASS-LINED METAL TUBES

[75] Inventors: Tadashi Yasui, Kobe; Isamu Nakamura, Amagasaki; Shigeo Goto, Kobe, all of Japan

[73] Assignee: Sybron Corporation, Rochester, N.Y.

[21] Appl. No.: 202,071

[22] Filed: Oct. 30, 1980

[30] Foreign Application Priority Data

Nov. 6, 1979 [JP] Japan ............................... 54-144070

[51] Int. Cl.³ ........................ C03C 27/02; C03C 27/04
[52] U.S. Cl. ..................................... 65/43; 65/59.21; 65/59.24; 29/523; 285/55
[58] Field of Search ................ 65/43, 59.21, 59.24; 285/55; 29/523

[56] References Cited

U.S. PATENT DOCUMENTS

| | | | |
|---|---|---|---|
| 2,986,847 | 6/1961 | Sato | 49/79 |
| 3,235,290 | 2/1966 | Young | 285/55 |
| 3,281,226 | 10/1966 | Tisinai | 65/59.24 |
| 3,729,803 | 5/1973 | Maksutov et al. | 65/59.24 |

Primary Examiner—Arthur D. Kellogg
Attorney, Agent, or Firm—J. Stephen Yeo; Robert A. Gerlach

[57] ABSTRACT

A method of manufacturing glass-lined tube. An undercoat of glass is fused onto the surfaces of nozzle-shaped flange-pieces, from their outer peripheral edges to their molded and curved inner faces, welding flange components then welded to either end of the metal tube to form a complete flange at each end. The inner faces of the weld zones are then shaped by grinding and polishing. A glass tube that is greater in length than the metal tube is fitted loosely into the latter tube. The glass tube is supported at either end within the wells of conical caps which are fitted around the flanges by air-permeable spacer-rings, with the ends of the glass tube extending beyond the outward faces of the flange joints and with the glass tube being securely positioned at the center line of the metal tube. The entire assembly is heated so that the glass tube will soften and expand under the influence of internal pressure, thus providing a continuous covering of the inner surface of the metal tube extending to the surface of the flange junction.

1 Claim, 3 Drawing Figures

U.S. Patent
Jan. 19, 1982
4,311,505
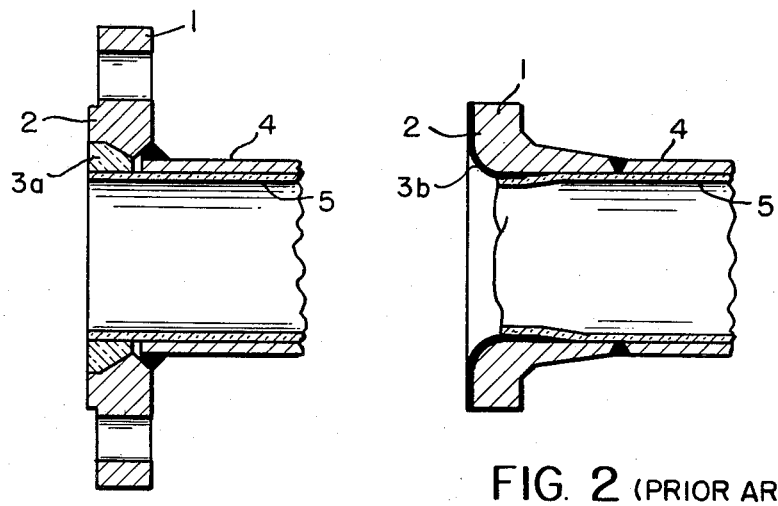
FIG. 1 (PRIOR ART)
FIG. 2 (PRIOR ART)
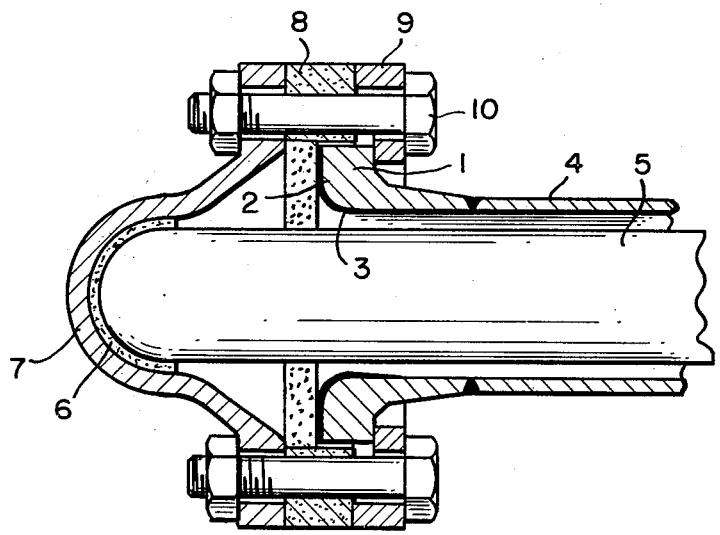
FIG. 3

METHOD OF MANUFACTURING GLASS-LINED METAL TUBES

BACKGROUND OF THE INVENTION

The invention concerns a method of manufacturing glass-lined metal tubes in which the inserted glass tube is formed into a continuous fused coating over the entire inner surface of the metal tube and over the surfaces of flanged joints.

Glass-lined metal tubes are widely used in many fields of the chemical engineering industry for the transfer of corrosive fluids and for heat transfer applications owing to their combined characteristics of high resistance to corrosion inherent in the glass and the mechanical strength offered by the metal tube. Further advantages are seen in the lack of scaling as a result of the smoothness of the glass lining and the strength of the tubes under conditions of heat.

Glass-lined metal tubes at present in general use fall into two main categories as far as the method adopted for the glass lining is concerned. The first method is one whereby the inner surface of the metal tube and the faces of flange joints are coated with a glazing agent which is then dried. The glazing agent is then calcined at high temperature to cause it to adhere to the surface of the metal. The process steps are repeated thus providing a multi-layer coating of agglutinated glass on the metal base. In the second method, a glass tube whose outer diameter is slightly smaller than the inner diameter of the metal tube is inserted into the latter, softened by heating and allowed to expand by normal air pressure so that it will become attached to the inner wall of the metal tube. Modifications of this method are described in U.S. Pat. Nos. 2,986,847 and 3,235,290.

The first of the above methods is a similar process to that which has been adopted for providing glass linings for containment vessels and it may also be used not only for straight tube sections but for valves, joints of various configurations, and components for pipe systems in which the diameters of the pipes and flanges are dissimilar. Because the shape of the flange faces is the same as the nozzle components of the glass lined containment vessels and because the glass coating is continuous up to the faces of the flange junctions, these types of glass-lined components are extensively used as accessories in such containment facilities.

However, when this method is adopted for the manufacture of small diameter and long lengths of glass-lined metal tube, it is difficult to ensure total covering of the interior of straight pipe sections and there is also some difficulty in inspection and rectification. The process is also expensive in that several repetitions of the glazing and calcination steps are necessary to ensure that all pinholes have been eliminated.

With the second method, on the other hand, the glass-lining process can be completed by a single heating stage in which the inserted glass tube is expanded and attached against the inner wall of the metal tube. There is no risk of the occurrence of pinholes in the glass lining in straight sections and there is also virtually no danger of damage occurring to the glass lining in straight sections when the tube is in use. The disadvantage, however, lies in the fact that there is a difficulty in extending the adhesion of the inserted glass tube to the flange faces and it is therefore the normal practice in this case for the lining to extend no further than the inner face of the flange. It is for that reason that many of the breakdowns in such tube systems caused by corrosion have, up to the present time, occurred at the flange joints.

The type of glass-lined metal tube most commonly used at the present time is produced by the glass tube insertion method illustrated in FIG. 1 below. In this case, a glass ring (3a), having a triangular cross-section, is inserted into an annular recess on the inner surface of the junction face (2) of the flange (1) so that, when it is heated and becomes soft, it will be fused with the end of the glass tube (5) which has been inserted into the metal tube (4). In this form of glass-lined metal tube, the glass material at the tube junctions will extend over only about one-half of the width of the flange-junction surface (2) so that, when the tubes are in service, permeation of corrosive fluid between those end faces (2) and gaskets will accelerate corrosion in the metallic parts of the periphery of the joints and will cause the glass ring (3a) to "float". This phenomenon is most marked in those locations where repeated heating and cooling makes it difficult to maintain the junction pressure at the flange faces and also in those locations where there are flanged junctions with, for example, glass-lined containment vessels in which there are curved sections in which the inner faces of the flanges have been molded or otherwise shaped. It is especially a problem in the case of joints with flanges of the type found in glass-lined containment vessels that, even if the curved inner faces of the flanges are precisely lined up with the above-mentioned glass rings (3a), and even when special gaskets are used, because of the virtual impossibility of ensuring a continuous surface of glass material at the joint area, this problem will not be entirely eliminated.

Furthermore, with this type of glass-lined metal tube, it will be necessary to grind off any projecting glass material from the flange faces (2) after cooling and the labor involved will increase in proportion to the size of the tube's diameter, with the added problem that there will be a risk of residual cracking of the glass material at those surfaces.

FIG. 2 illustrates an approach to the solution of the foregoing problems at the flange faces of this type of glass-lined metal tube. After applying a coating (3b) of either ceramic or glass material, by glazing and calcination, from the end face of the flange (1) to the tube interior, the inserted glass tube (5) is heated and softened so that its end will overlap the coating (3b) and, at the same time, adhere to the inner wall of the metal tube (4). With this approach, however, if the durability of the flange coating (3b) in a corrosive environment is to match the durability of the glass tube (5) that has been inserted in the metal sleeve, it will be necessary to repeat the glazing and calcination process of the flange coating (3b) at least four or five times in order to obtain the correct finish. This will lead to high costs. Furthermore, irregular breaking in the vicinity of curved portions on the inner sides of flange faces during cooling will expose the broken ends to corrosive fluids during service and there will be a risk of glass fragments being carried into the fluid.

The object of the embodied invention is to sustain the advantages of the glass tube insertion method and, at the same time, to overcome the problems listed above in connection with the flange faces.

SUMMARY OF THE INVENTION

Briefly, the process consists of manufacturing glass-lined metal tubes where it is possible to obtain a continuous coating of glass material. Flanges, onto which an undercoating of glass has been fused to extend from the face of the flange to the curved inner surface, are welded at both ends of the metal tube. A conical cap is fixed in position at each flange by means of a ventilation spacer surrounding the outer face of the flange. The caps support both ends of a inserted glass tube and holds it at the center line of the metal tube. The whole assembly is heated to allow the inserted glass tube to soften and expand. The process requires fewer steps necessary to ensure that the glass coating extends fully from the inner wall of the metal tube to the outer face of the flange.

BRIEF DESCRIPTION OF THE DRAWINGS

FIG. 1 and FIG. 2 are sectional views of glass lined metal pipe manufactured by glass tube inserting methods known to the prior art, and FIG. 3 is a sectional view of a tube end and assembly, providing an example of the manufacturing method of this invention.

DETAILED DESCRIPTION OF THE INVENTION

The following detailed description of the embodied invention is given in conjunction with the example of its preferred embodiment as illustrated in the FIG. 3. Nozzle shaped flanges (1) are subjected to sand-blasting or similar surface treatment. Then a single thin undercoating of glass (3) is applied, by glazing and calcination, to extend from the face of each flange (2) to the curved inner face of the flange (1). A flange is then welded to each end of the steel or other metal tube (4). By surface-finishing treatment by grinders or similar means, the inner surfaces of a welded region is smoothed and the metal tube (4) is made ready for insertion of the glass tube.

In the next step, a glass tube (5), whose outer diameter is slightly smaller than the inner diameter of the metal tube (4) is inserted into the latter. The ends of the glass tube (5) are sealed and are of such a length as to project beyond the flange faces (2) at each end of the metal tube (4). Each end of the glass tube is seated in a central recess of a conical cap (7) against a section of padding material (6). A split flange (9), which encloses a spacer (8) encircling the outer perimeter of the flange face (2), is placed in position and secured to the flange assembly (1) by means of a nut and bolt (10). The above-mentioned padding material (6) is intended to regulate the space between the glass tube (5) and the cap (7) and to prevent damage to the glass tube (5) when the nut and bolt (10) are tightened. The role of the central recess of the cap (7) is both to hold the glass tube (5) at the center line of the metal tube (4) and to prevent abnormal expansion at the end of the glass tube (5) during the heating and softening steps. The above-mentioned spacer (8) is of an air-permeable and heat-resistant fiber material whose thickness can be adjusted.

When the foregoing assembly has been completed, it is placed in a furnace and heated at a prescribed rate to a temperature at which the glass tube (5) will become soft. The temperature is maintained at this level for a fixed period.

Both the flange (1) and the cap (7) have a skin thickness that is greater than the walls of the metal tube (4), so that the transmission of heat in those components will be slower, with the result that those parts of the glass tube (5) within the metal tube (4) will soften quicker than the glass outside of the tube. The expansion of the air trapped in the tube will force the glass into close contact with the inner surface of the metal tube (4) expelling the air between the glass tube (5) and the metal tube (4) through the air-permeable spacer (8) encircling the outer periphery of the flange where it is discharged to the atmosphere, thus avoiding any entrapment of air between the glass tube (5) and the metal tube (4) at their cohesion points. When both ends of the glass tube (5) are at the softening temperature, the parts of the glass tube (5) in those areas will fold and bend in conformity with the conical face of the cap (7) which is facing towards the flange face (2) and also with the curved surface on the inner side of the flange face (2). The result will be that those parts of the tube will expand in such a manner as to be drawn into the spacer (8) around the outer face of the flanges and that those parts of the tube that extend as far as the spacer (8) will undergo a deceleration in expansion at the same time as the remaining parts are continuing to expand, thus ensuring that there is no variation in the skin thickness of the coating of glass as a result of irregularity in the expansion of the glass tube (5) overall. Furthermore, there will be no interruption in the glass coating in the area extending to the flange face (2) and, in this manner it has been found possible to achieve continuity in the glass coating from the interior surfaces of the metal tube (4) to the flange faces (2). Owing to the fact that the previously applied undercoating of glass at the latter parts will become fused and integrated with the glass tube (5) and the integrated body of glass will then become securely adhered to the metallic base, there will be no risk of breaking or chipping the glass coating at the flange faces (2) when the tube assembly is subjected to cooling. Those parts of the glass tube (5) which project beyond the flange faces (2) will be fractured by natural process at the line of the peripheries of the flange faces (2) when the assembly is cooled, giving a smooth surface at the break. The absence of glass splinters or sharp projections obviates the necessity for grinding or similar finishing work after cooling.

The foregoing example of the preferred embodiment of the invention has described a coating process in which a glass tube (5), sealed at each end, has been employed. It is, however, possible to use glass tubes that are open at one or at both ends and to provide an air intake aperature at the center recess of a cap at one end of the assembly. The open ends of the glass tube are sealed at the recesses of the caps. When heating is applied and the temperature of the glass tube has reached the softening point, compressed air can be passed to the interior of the glass tube through the air intake aperture in the cap.

The above description has shown that, in the process embodying the invention, the separate stage of applying an undercoating of glass to the flange faces can be regarded as a means of reducing the number of production steps for glass-lined metal tubes and also of providing a satisfactory surface finish to the joint between the flanges and the metal tube after welding. Furthermore, the subsequent coating by the glass tube enables the entire protection process to be carried out in a single heating cycle. In addition, because the undercoating of glass is fused to the metal by a glazing and calcination process, there will be no separation of that undercoating when the glass tube is inserted neither will there be any formation of air bubbles in that area during the heating and coating process that follows, so that the glass tube and the undercoating will become fused together and both will be securely fixed to the metal of the tube. Moreover, there will be no breaking or chipping of the glass undercoating when the assembly is cooled. Further heating processes will be made in conditions where both ends of the glass tube are supported by the conical caps that are placed so as to face towards the flange faces, to enable uniform expansion of the tube to take place towards the spacer adjoining the outer face of the flange at each end, thus resulting in a positive coating over the entire flange face area. Post-cooling finishing operations, by grinding or similar means, are not required due to the fact that those parts of the glass tube that extend beyond the flange faces will be broken off, by natural process, in the cooling stage, leaving a smooth surface of glass around the outer peripheries of the flange faces.

Glass-lined metal tubes that have been produced by the method and procedure as described above will be such that the glass tube will extend over the entire inner surface of the metal tube up to and including its flange faces. The adhesion of the glass to the metal will be secure and there will, therefore, be no danger of corrosion damage occurring at the flanges due to permeation of corrosive liquids at the joints between tube sections. The process is also suitable for application to glass-lined containment vessels and their fittings, owing to the flange faces being of the same configuration as the nozzle sections of those vessels.

EXAMPLES OF PRACTICAL APPLICATION (1) Resistance to Thermal Impact

Experimental samples of assemblies as illustrated in FIGS. 1 and 2, with nominal diameters of 50 mm each, together with an experimental sample of an assembly produced by the process embodied in the invention, with a nominal diameter of 80 mm, were each first held for 1 hour at the prescribed heating temperature and then flash-cooled by immersion in water at 30°+0.5° C. The temperature differences, T, at which glass fracturing first occured in each case (i.e., the difference between the maintained heating temperature of the sample and the temperature of the cooling water) were as follows:

1. Experimental sample from FIG. 1: T=90° C.;
2. Experimental sample from FIG. 2: T=140° C.;
3. Experimental sample by invented process: T=180° C.;

(2) Resistance to Hot Water

The same experimental samples were used and each was sealed at the ends with blanking covers to provide short sections of tube containing pure water (ion-exchange water). The samples were then placed in a constant-temperature drying oven for 96 hours at 120° C., after which the condition of the glass surface was examined.

1. Experimental sample from FIG. 1: Needle-like glass fragments observed in the liquid.
2. Experimental sample from FIG. 2: Flaked fragments of glass observed in the fluid after 24 hours.
3. Experimental sample by claimed process: No change or abnormality.

In none of the above cases was any abnormality in the surface of the glass detectable with the naked eye.

Having described our invention, we claim:

1. A method for manufacturing glass-lined pipes comprising the steps of:
    (a) applying a thin lining of undercoat glass 3 onto the end surface 2 of a metal flange 1;
    (b) welding a flange member 1 to each end of a metal pipe 4;
    (c) smoothing the inner surface of the welded region;
    (d) inserting a glass tube 5 longer than the metal pipe into the said metal pipe 4 and supporting both ends of the glass tube by conical caps 7 and cushion material 6;
    (e) mounting said caps on both flange portions of the metal pipe;
    (f) surrounding the outer periphery of each flange end surface with an air permeable spacer ring 8; and
    (g) heating the assembled units to soften the glass tube and inflating the glass tube by internal pressure so that continuous glass coating is provided from the inner surface of the metal pipe to the end surface of the flange member.

* * * * *